United States Patent [19]
Benzinger et al.

[11] Patent Number: 5,114,215
[45] Date of Patent: May 19, 1992

[54] BRAKE SYSTEM

[75] Inventors: Roland Benzinger, Stuttgart; Edgar Schmitt, Vaihingen/Enz; Heinz Siegel, Stuttgart; Ewald Huebl, Schwieberdingen; Klaus Mueller, Tamm; Manfred Himmelsbach, Villingen-Schwenningen; Martin Jordan, Koblenz, all of Fed. Rep. of Germany

[73] Assignee: Robert Bosch GmbH, Stuttgart, Fed. Rep. of Germany

[21] Appl. No.: 575,761

[22] Filed: Aug. 31, 1990

[30] Foreign Application Priority Data

Sep. 27, 1989 [DE] Fed. Rep. of Germany ....... 3932147

[51] Int. Cl.⁵ .......................... B60T 8/44; B60T 8/32
[52] U.S. Cl. ..................... 303/113 TB; 303/114 R; 303/DIG. 2
[58] Field of Search ................. 303/114, 110, 93, 115, 303/119, 101, 113, 114 R, 113 TB, 116 R, 115 PP, 119 R; 180/197

[56] References Cited

U.S. PATENT DOCUMENTS

| 3,556,608 | 1/1971 | MacDuff et al. | 303/114 |
| 4,123,117 | 10/1978 | Adachi | 303/114 |
| 4,620,750 | 11/1986 | Leiber | 303/114 |
| 4,660,897 | 4/1987 | Leiber | 303/114 |
| 4,660,898 | 4/1987 | Steffes | 303/114 |
| 4,743,075 | 5/1988 | Belart et al. | 303/113 TB |
| 4,807,944 | 2/1989 | Weise | 303/113 TB |
| 4,815,793 | 3/1989 | Reinartz et al. | 303/114 |
| 4,826,258 | 5/1989 | Ocvirk et al. | 303/113 TB X |
| 4,834,469 | 5/1989 | Kohno et al. | 303/116 R |
| 4,883,328 | 11/1989 | Burgdorf et al. | 303/116 R |
| 4,952,003 | 8/1990 | Okubo | 303/110 X |

Primary Examiner—Robert J. Oberleitner
Assistant Examiner—Peter M. Poon
Attorney, Agent, or Firm—Edwin E. Greigg; Ronald E. Greigg

[57] ABSTRACT

A brake system with traction control, having a master brake cylinder for at least one brake circuit and having a brake booster is proposed. By operation of a pump, servo pressure is fed into the brake booster via a pressure connection provided on the brake booster, and the servo pressure reaches a pressure reservoir through a bore provided on the brake booster. From there, given a corresponding open passage position of magnetic valves, the servo pressure, via a supply line, reaches the pressure cylinder present in the brake booster, and in the pressure cylinder there is a valve slide that, via a servo piston, actuates a pressure rod leading to the master brake cylinder.

15 Claims, 2 Drawing Sheets

BRAKE SYSTEM

BACKGROUND OF THE INVENTION

The invention relates to a brake system as defined hereinafter. Various embodiments of brake systems of this type, equipped with a traction control system, are known and are in use. Typically, the master brake cylinder piston is decoupled from the brake pedal. Such brake systems are proposed for instance in U.S. Pat. Nos. 4,620,750 and 4,660,897. In these systems, so-called 3/3-way monitor control valves monitor the brake booster function upon feeding of pressure, brake pressure failure, and energy failure. As a result, the effect attained is that the brake circuit is subjected to pressure, regardless of the actuation of the brake pedal. The action thus attained is used particularly in traction control.

OBJECT AND SUMMARY OF THE INVENTION

A brake system of the embodiment described has the substantial advantage that the brake booster is expanded to traction control operation. The traction control function begins at the hydraulic brake booster. This is attained by providing an additional pressure connection on the brake booster, so that by way of it, by imposing servo pressure, traction control functions can be attained. The pressure reservoir is supplied via a pump with pressure fluid that is delivered to the pressure reservoir via the brake booster, in that pressure fluid is introduced, via the additional pressure connection, into an annular chamber provided in the brake booster and surrounding a servo piston, and from this chamber the pressure fluid is carried via a bore provided on the brake booster to the pressure reservoir by means of a servo pressure line leading to the pressure reservoir. When the magnetic valves are in the position for flow through them, servo pressure medium is fed, via a further servo pressure line leading from the pressure reservoir to the brake booster, through an inlet bore also disposed on the brake booster into a supply line to the pressure cylinder, the supply line being located in the brake booster and the pressure cylinder being connected to the brake pedal. The pressure cylinder and a valve slide located in it are actuated via a drive piston located in the pressure cylinder; the capability of pressure fluid inflow from the annular chamber into the servo piston is regulated via this valve slide.

A return flow capability is provided for the servo pressure, at an applicable position of the magnetic valves, via an axial bore that penetrates the valve slide. The resultant regulation of the servo pressure inside the brake booster therefore enables traction control operations within the brake booster of the brake system.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
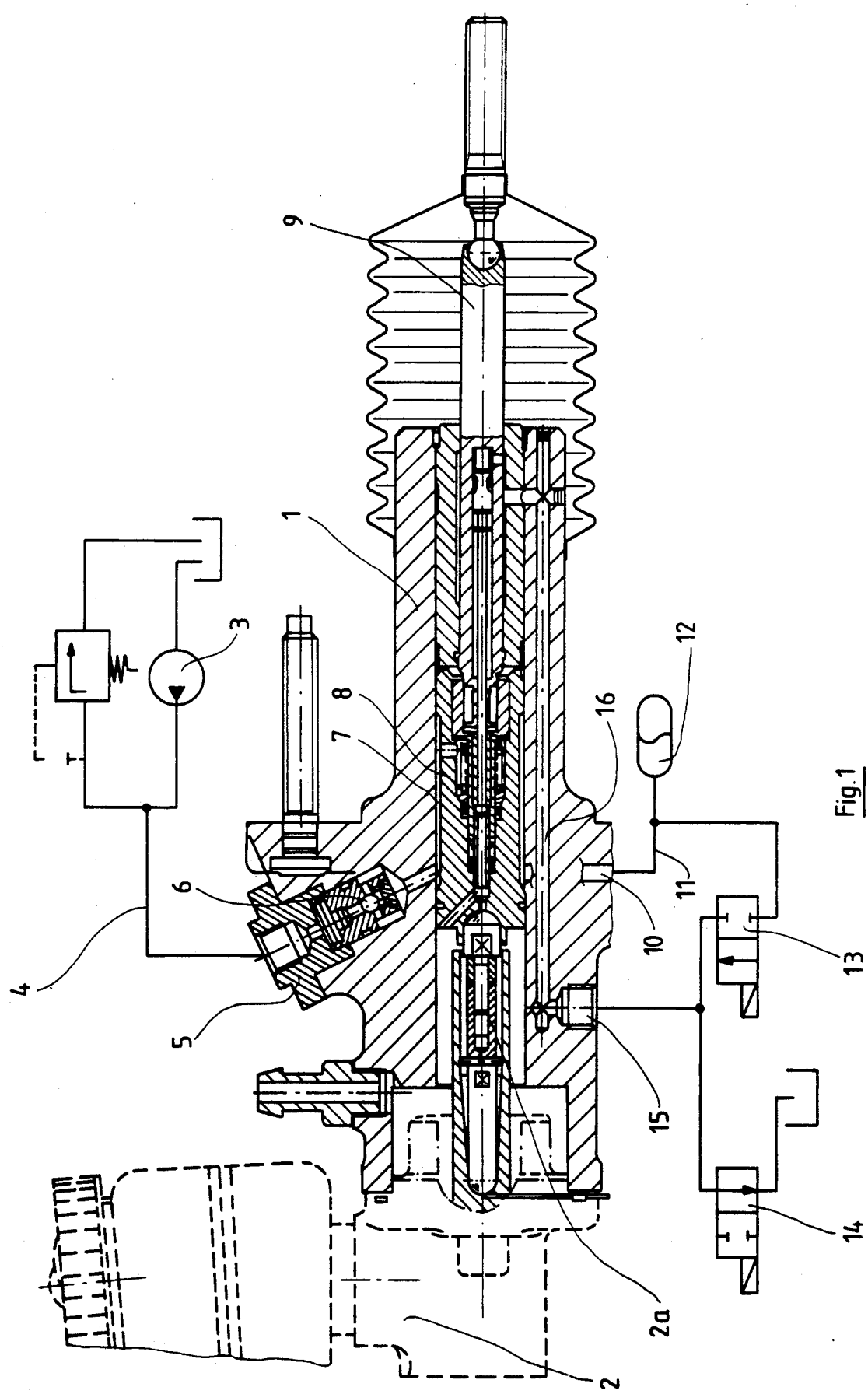
FIG. 1 shows the brake booster with a master brake cylinder flanged to it, in a side view partially cut away.

FIG. 1 shows the brake booster 1 and the master brake cylinder 2 flanged to it. A pressure rod 2a leading to the master brake cylinder 2 is provided in the brake booster 1. From a pump 3, a servo pressure line 4 leads to a pressure connection 5, which is disposed on the brake booster 1 and in which a check valve 6 is disposed. The pressure connection 5 discharges into an annular chamber 7 that surrounds a servo piston 8. A pressure cylinder 9 is also provided in the brake booster 1 and is connected to the brake pedal, not visible in the drawing. Through a bore 10 provided on the brake booster, a further servo pressure line 11 leads into the pressure reservoir 12. Via magnetic valves 13 and 14, the servo pressure line 11 leads through an inlet bore 15, likewise disposed on the brake booster, into a supply line 16 to the pressure cylinder 9.

The reservoir 12 is supplied with servo pressure by the pump 3 via the check valve 6 located in the pressure connection 5, the annular chamber 7 surrounding the servo piston 8, and the bore 10. In traction control operation, servo pressure is fed into the supply line 16 to the pressure cylinder 9 via the inlet bore 15, with the magnetic valve 13 in the open position and with simultaneous closure of the magnetic valve 14.

Figure 2:
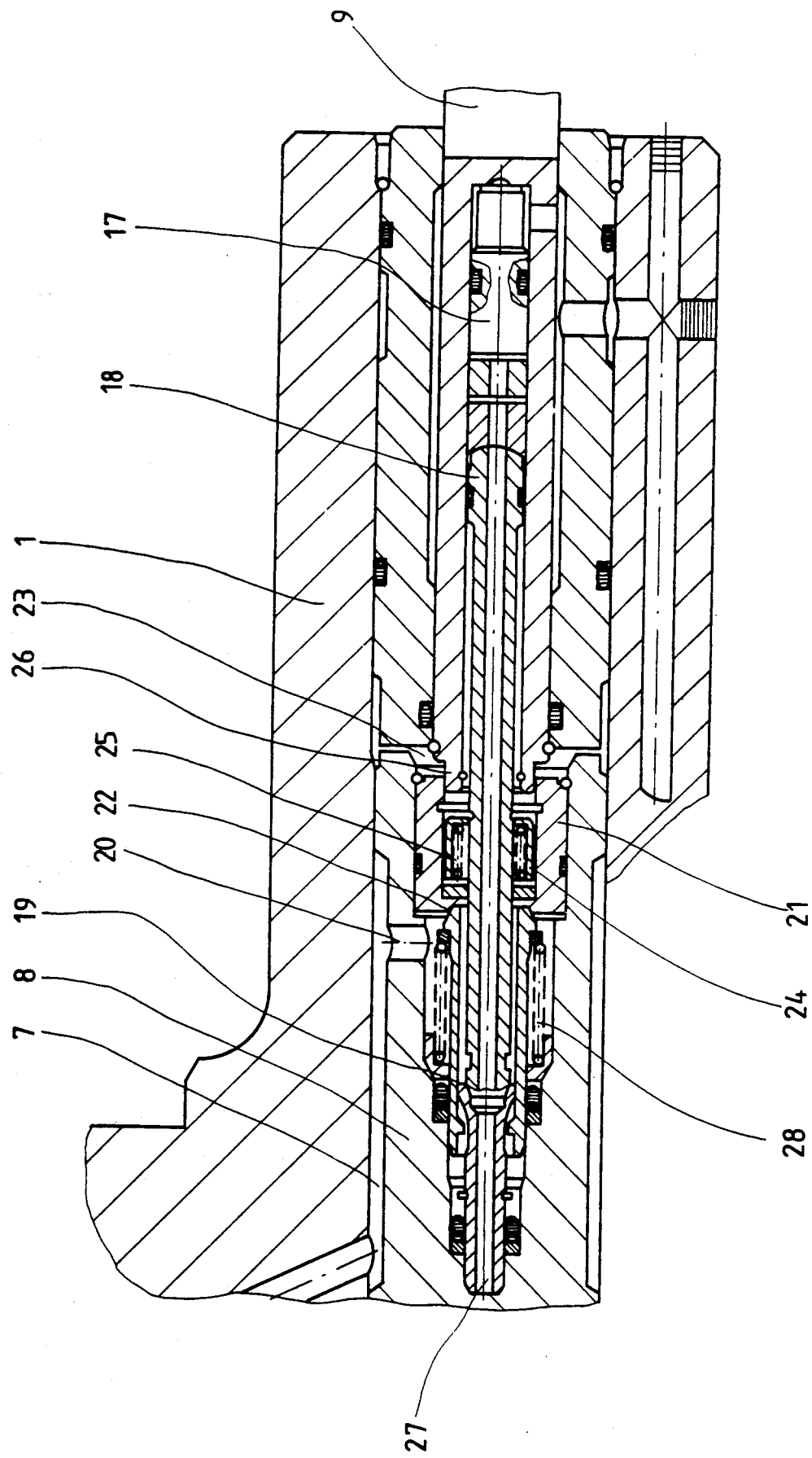
FIG. 2 is an enlarged view of a detail of the brake booster shown in FIG. 1.

From FIG. 2, which shows the brake booster 1 on a larger scale, a piston 17 located in the pressure cylinder 9 can be seen, which abuts a valve slide 18, also located partly in the pressure cylinder 9. On the opposite end of the valve slide 18 from the piston 17, an inner valve seat 19 is provided. A through bore 20 is provided between the annular chamber 7 surrounding the servo piston 8 and the valve slide; an outer valve seat 22 is located between the through bore and a sleeve 21 disposed in the servo piston 8. A work chamber 23 is provided between the sleeve 21 and the pressure cylinder 9. A housing 24 surrounding the valve slide 18 is located in the sleeve 21, and valve springs 25 extending parallel to the valve slide 18 are disposed in this housing. A snap ring 26 is located on the end of the pressure cylinder 9 toward the sleeve 21. The valve slide 18 is penetrated by an axial bore 27.

Because of the imposition of servo pressure upon the pressure cylinder 9 in the manner shown in FIG. 1, the piston 17 moves to the left in terms of the drawing within the pressure cylinder 9, in the process of which it likewise presses the valve slide 18 toward the left. Because of this, the valve slide 18 closes the inner valve seat 19, and as a result the servo pressure present in the annular chamber surrounding the servo piston 8 reaches the work chamber 23 and displaces the servo piston 8 to the left. In this process the pressure cylinder 9 maintains its position. The servo piston 8 then, via the pressure rod 2a visible in FIG. 1, actuates the master brake cylinder 2, and as a result brake pressure can be built up in both brake circuits. The snap ring 26 secures the valve slide 18 against slipping out of the pressure cylinder 9. If the traction control pressure is switched off by a return of the magnetic valves 13 and 14 to the position shown in FIG. 1, then the piston 17 exerts no further force upon the valve slide 18. The valve spring 25 then moves the valve slide 18 to the right, in the view of FIG. 2, and thus assures opening of the inner valve seat 19. The pressure in the work chamber 23 can thus escape into the return line via the axial bore 27, and as a result the servo piston 8 is moved back into the outset position shown in FIG. 2 by the pressure originating in the master brake cylinder 2 and in the spring 28. In this process the housing 24 limits the axial mobility of the valve slide 18 in the brake valve. As a result of adequate play of the housing 24 in the sleeve 21, the articulated support of the valve slide 18 is retained, so that when the inner valve seat 19 closes, the valve slide 18 centers itself.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A brake system with traction control, comprising a master brake cylinder for at least one brake circuit, a brake booster operative by a pedal, said brake booster includes a pressure cylinder (9) which leads to the brake pedal, a displaceable servo piston and a pressure rod to actuate said master cylinder, a pressure reservoir, said pressure reservoir communicates with the brake booster via servo pressure lines, magnetic valves (13, 14) disposed in said servo pressure lines to regulate servo pressure and to provide traction control thereby, a pump (3), a pressure connection (5) which communicates with said pump (3) via a servo pressure line (4), an annular chamber (7) in said brake booster which surrounds said servo piston (8), said pressure connection discharges in the brake booster (1) into said annular chamber (7) which surrounds the servo piston (8), a servo pressure line (11) leading from the annular chamber (7) to the pressure reservoir (12) through a bore (10) is provided on the brake booster (1), and a supply line (16) is provided leading from the pressure reservoir (12) to the pressure cylinder (9), via said magnetic valves (13, 14), and through an inlet bore (15) that is provided on the brake booster (1), a piston (17) abuts a valve slide (18), which is movable partially within the pressure cylinder (9) and partially within the servo piston (8), said valve slide (18) is further adapted to actuate an inner valve seat (19).

2. A brake system as defined by claim 1, in which an axial bore (27) penetrates the valve slide (18).

3. A brake system as defined by claim 1, in which a through bore (20) is provided between the annular chamber (7) which surrounds the sere piston and the vale slide (18) in the servo piston (8), an outer valve seat (22) located between said through bore and a sleeve (21) disposed in the sere piston (8).

4. A brake system as defined by claim 1, in which a snap ring (26) is provided on the face end of the pressure cylinder (9) oriented toward the servo piston (8).

5. A brake system as defined by claim 1, in which a check valve (6) is disposed at the pressure connection (5) which leads to the pump (3).

6. A brake system as defined by claim 1, in which two magnetic valves (13, 14) are disposed between the pressure reservoir (12) and the brake booster (1), said valves adapted to provide a blocked position and a passageway open position on both ends from the pressure reservoir (12) to the brake booster (1), so that when one magnetic valve is open, the other magnetic valve is closed, and vice versa.

7. A brake system with traction control, comprising a master brake cylinder for at least one brake circuit, a brake booster operative by a pedal, said brake booster includes a pressure cylinder (9) which leads to the brake pedal, a displaceable servo piston and a pressure rod to actuate said master cylinder, a pressure reservoir, said pressure reservoir communicates with the brake booster via sere pressure lines, magnetic valves (13, 14) disposed in said servo pressure lines to regulate servo pressure and to provide traction control thereby, a pump (3), a pressure connection (5) which communicates with said pump (3) via a servo pressure line (4), an annular chamber (7) in said brake booster which surrounds said servo piston (8), said pressure connection discharges in the brake booster (1) into said annular chamber (7) which surrounds the servo piston (8), a servo pressure line (11) leading from the annular chamber (7) to the pressure reservoir (12) through a bore (10) is provided on the brake booster (1), a supply line (16) is provided leading from the pressure reservoir (12) to the pressure cylinder (9), via said magnetic valves (13, 14), and through an inlet bore (15) that is provided on the brake booster (1), a movable piston (17) is provided in the pressure cylinder (9), and the movable piston (17) abuts a valve slide (18), which is movable partially within the pressure cylinder (9) and partially within the servo piston (8), said valve slide (18) is further adapted to actuate an inner valve seat (19).

8. A brake system as defined by claim 7, in which an axial bore (27) penetrates the valve slide (18).

9. A brake system as defined by claim 7 in which a through bore (20) is provided between the annular chamber (7) which surrounds the servo piston and the valve slide (18) in the servo piston (8), an outer valve seat (22) located between said through bore and a sleeve (21) disposed in the servo piston (8).

10. A brake system with traction control, comprising a master brake cylinder for at least one brake circuit, a brake booster operative by a pedal, said brake booster includes a pressure cylinder (9) which leads to the brake pedal, a displaceable servo piston and a pressure rod to actuate said master cylinder, a pressure reservoir, said pressure reservoir communicates with the brake booster via servo pressure lines, magnetic valves (13, 14) disposed in said servo pressure lines to regulate servo pressure and to provide traction control thereby, a pump (3), a pressure connection (5) which communicates with said pump (3) via a servo pressure line (4), an annular chamber (7) in said brake booster which surrounds said servo piston (8), said pressure connection discharges in the brake booster (1) into said annular chamber (7) which surrounds the servo piston (8), a servo pressure line (11) leading from the annular chamber (7) to the pressure reservoir (12) through a bore (10) is provided on the brake booster (1), a supply line (16) is provided leading from the pressure reservoir (12) to the pressure cylinder (9), via said magnetic valves (13, 14), and through an inlet bore (15) that is provided on the brake booster (1), a through bore (20) is provided between the annular chamber (7) which surrounds the servo piston and a valve slide (18) in the servo piston (8), and an outer valve seat (22) is located between said through bore and a sleeve (21) disposed in the servo piston (8).

11. A brake system as defined by claim 10, in which a work chamber (23) is provided between the sleeve (21) and the pressure cylinder (9).

12. A brake system as defined by claim 11, in which valve springs (25) are located in a housing (24) and are disposed in the sleeve (21) extending parallel to the valve slide.

13. A brake system as defined by claim 10, in which valve springs (25) are located in a housing (24) and are disposed in the sleeve (21) extending parallel to the valve slide.

14. A brake system with traction control, comprising a master brake cylinder for at least one brake circuit, a brake booster operative by a pedal, said brake booster includes a pressure cylinder (9) which leads to the brake pedal, a displaceable servo piston and a pressure rod to actuate said master cylinder, a pressure reservoir, said pressure reservoir communicates with the brake booster via servo pressure lines, magnetic valves (13, 14) disposed in said servo pressure lines to regulate servo pressure and to provide traction control thereby, a pump (3), a pressure connection (5) which communicates with said pump (3) via a servo pressure line (4), an annular chamber (7) in said brake booster which surrounds said servo piston (8), said pressure connection discharges in the brake booster (1) into said annular chamber (7) which surrounds the servo piston (8), a servo pressure line (11) leading from the annular chamber (7) to the pressure reservoir (12) through a bore (10) is provided on the brake booster (1), a supply line (16) is provided leading from the pressure reservoir (12) to the pressure cylinder (9), via said magnetic valves (13, 14), and through an inlet bore (15) that is provided on the brake booster (1), a movable piston (17) is provided in the pressure cylinder (9), a through bore (20) is provided between the annular chamber (7) which surrounds the servo piston and a valve slide (18) in the servo piston (8), an outer valve seat (22) is located between said through bore and a sleeve (21) disposed in the servo piston (8).

15. A brake system with traction control, comprising a master brake cylinder for at least one brake circuit, a brake booster operative by a pedal, said brake booster includes a pressure cylinder (9) which leads to the brake pedal, a displaceable servo piston and a pressure rod to actuate said master cylinder, a pressure reservoir, said pressure reservoir communicates with the brake booster via servo pressure lines, magnetic valves (13, 14) disposed in said servo pressure lines to regulate servo pressure and to provide traction control thereby, a pump (3), a pressure connection (5) which communicates with said pump (3) via a servo pressure line (4), an annular chamber (7) in said brake booster which surrounds said servo piston (8), said pressure connection discharges in the brake booster (1) into said annular chamber (7) which surrounds the servo piston (8), a servo pressure line (11) leading from the annular chamber (7) to the pressure reservoir (12) through a bore (10) is provided on the brake booster (1), a supply line (16) is provided leading from the pressure reservoir (12) to the pressure cylinder (9), via said magnetic valves (13, 14), and through an inlet bore (15) that is provided on the brake booster (1), an axial bore (27) penetrates a valve slide (18) in said servo piston (8), a through bore (20) is provided between the annular chamber (7) which surrounds the servo piston and the valve slide (18) in the servo piston (8), and an outer valve seat (22) is located between said through bore and a sleeve (21) disposed in the servo piston (8).

\* \* \* \* \*